(12) United States Patent
Hatakeyama et al.

(10) Patent No.: US 8,955,559 B2
(45) Date of Patent: Feb. 17, 2015

(54) FUEL VAPOR HANDLING SYSTEM FOR AUTOMOTIVE FUEL TANK

(75) Inventors: Kenichi Hatakeyama, Hiroshima (JP); Toshiaki Miyagawa, Hiroshima (JP); Osamu Fujiyama, Hiroshima (JP)

(73) Assignee: Keylex Corporation, Hiroshima (JP)

( * ) Notice: Subject to any disclaimer, the term of this patent is extended or adjusted under 35 U.S.C. 154(b) by 289 days.

(21) Appl. No.: 13/642,023

(22) PCT Filed: Mar. 29, 2011

(86) PCT No.: PCT/JP2011/001878
§ 371 (c)(1),
(2), (4) Date: Oct. 18, 2012

(87) PCT Pub. No.: WO2011/132367
PCT Pub. Date: Oct. 27, 2011

(65) Prior Publication Data
US 2013/0032243 A1    Feb. 7, 2013

(30) Foreign Application Priority Data

Apr. 19, 2010    (JP) .................................. 2010-096366

(51) Int. Cl.
B60K 15/035    (2006.01)
F02M 25/08    (2006.01)
F02M 37/00    (2006.01)

(52) U.S. Cl.
CPC ........ *F02M 25/089* (2013.01); *B60K 15/03504* (2013.01); *F02M 37/0076* (2013.01)
USPC .................... 141/44; 141/52; 141/95; 141/98

(58) Field of Classification Search
USPC .............................. 141/44, 52, 55, 94–95, 98
See application file for complete search history.

(56) References Cited

U.S. PATENT DOCUMENTS

| 4,798,306 A | * | 1/1989 | Giacomazzi et al. | ........ 220/86.2 |
| 5,205,330 A | * | 4/1993 | Sekine | ............................ 141/59 |

(Continued)

FOREIGN PATENT DOCUMENTS

| JP | 06-193519 | 7/1994 |
| JP | 07-012015 | 1/1995 |

(Continued)

OTHER PUBLICATIONS

International Searching Authority, International Search Report for Application No. PCT/JP2011/001878, mailed May 17, 2011, 4 pages, Japan Patent Office, Japan.

(Continued)

*Primary Examiner* — Nicolas A Arnett
(74) *Attorney, Agent, or Firm* — Alston & Bird LLP

(57) ABSTRACT

Fuel vapor is prevented from leaking to the outside during refueling, and even when an air space is formed in an upper portion of a fuel filler pipe, a diagnosis of leakage of fuel vapor can be performed with good accuracy. During refueling, fuel vapor is guided from a fuel tank 1 to a canister 3, and is absorbed by the canister 3. A change in the internal pressure of a fuel vapor path including the fuel tank 1, a fuel vapor pipe 4, and the canister 3 is detected by a pressure sensor 8, thereby performing a diagnosis of leakage of fuel vapor. An upper space 16 in the fuel tank 1 and an upper space 17 in a fuel filler pipe 2 communicate with each other through an airflow resistance pipe 12, and in order to restrict flow of fuel vapor from the fuel tank 1 through the airflow resistance pipe 12 into the fuel filler pipe 2 during refueling, the airflow resistance pipe 12 includes an orifice 13.

2 Claims, 1 Drawing Sheet

(56) References Cited

U.S. PATENT DOCUMENTS

| | | | |
|---|---|---|---|
| 5,215,132 A * | 6/1993 | Kobayashi | 141/302 |
| 5,295,472 A | 3/1994 | Otsuka et al. | |
| 5,462,100 A * | 10/1995 | Covert et al. | 141/59 |
| 5,590,697 A * | 1/1997 | Benjey et al. | 141/59 |
| 5,623,911 A * | 4/1997 | Kiyomiya et al. | 123/520 |
| 5,679,890 A | 10/1997 | Shinohara et al. | |
| 5,769,057 A | 6/1998 | Hashimoto et al. | |
| 5,860,458 A * | 1/1999 | Benjey et al. | 141/59 |
| 6,167,920 B1 * | 1/2001 | Enge | 141/5 |
| 6,253,802 B1 * | 7/2001 | Enge | 141/59 |
| 6,276,343 B1 | 8/2001 | Kawamura et al. | |
| 6,367,458 B1 | 4/2002 | Furusho et al. | |
| 6,533,002 B1 * | 3/2003 | Kobayashi et al. | 141/302 |
| 6,564,782 B2 * | 5/2003 | Fujimoto et al. | 123/520 |
| 6,601,617 B2 * | 8/2003 | Enge | 141/7 |
| 6,851,458 B2 * | 2/2005 | Nakajima et al. | 141/44 |
| 6,854,492 B2 * | 2/2005 | Benjey | 141/198 |
| 6,863,095 B2 * | 3/2005 | Osaki et al. | 141/44 |
| 6,874,485 B2 * | 4/2005 | Fujimoto | 123/520 |
| 7,866,356 B2 * | 1/2011 | Benjey | 141/198 |
| 2002/0046609 A1 | 4/2002 | Ito | |
| 2002/0112703 A1 * | 8/2002 | Fujimoto et al. | 123/520 |
| 2003/0056837 A1 | 3/2003 | Benjey | |
| 2003/0183206 A1 * | 10/2003 | Fujimoto et al. | 123/520 |
| 2004/0200460 A1 | 10/2004 | Mitani et al. | |

FOREIGN PATENT DOCUMENTS

| | | |
|---|---|---|
| JP | 07-279788 A | 10/1995 |
| JP | 09-105364 A | 4/1997 |
| JP | 2001-115915 A | 4/2001 |
| JP | 2002-004958 A | 1/2002 |
| JP | 2002-188529 | 7/2002 |
| JP | 2002-317708 A | 10/2002 |
| JP | 2004-270573 A | 9/2004 |

OTHER PUBLICATIONS

International Searching Authority, Written Opinion for Application No. PCT/JP2011/001878, mailed May 17, 2011, 3 pages, Japan Patent Office, Japan.

* cited by examiner

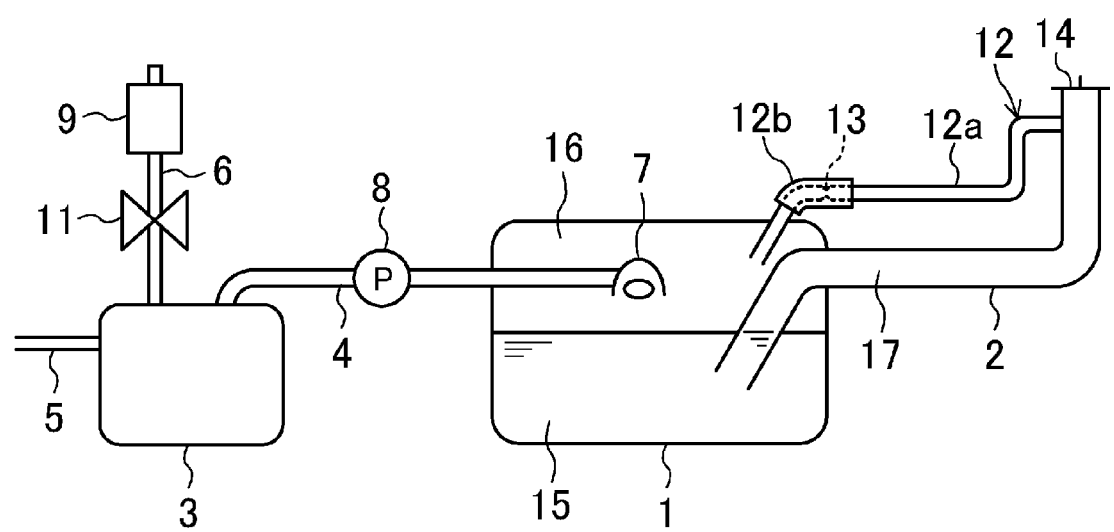

FUEL VAPOR HANDLING SYSTEM FOR AUTOMOTIVE FUEL TANK

TECHNICAL FIELD

The present invention relates to fuel vapor handling systems for automotive fuel tanks.

BACKGROUND ART

During refueling in which fuel (fuel oil) is charged into an automotive fuel tank, fuel vapor is generated. PATENT DOCUMENT 1 describes handling of fuel vapor generated during such refueling, in which an upper end portion of a fuel filler pipe is connected through a breather pipe to a fuel tank, the fuel vapor is released from the fuel tank through the breather pipe toward a fuel filler gun (the upper end portion of the fuel filler pipe), and is returned to the fuel tank. However, in such a system, fuel vapor tends to leak through a fuel filler pipe to the outside during refueling. To address this problem, PATENT DOCUMENT 2 describes that a canister configured to absorb evaporated fuel is connected to a fuel tank through a fuel vapor pipe (evaporator pipe), and fuel vapor generated in the fuel tank during refueling is discharged to the canister.

The fuel vapor absorbed by the canister is purged (released) through a purge pipe to an intake system of an engine. An automobile having such a fuel vapor purging system preferably includes a diagnostic system for finding leakage of fuel vapor due to, e.g., perforation in order to ensure the reliability of the system. For example, PATENT DOCUMENT 3 describes that a pressure sensor for a fuel vapor path including a fuel tank, a fuel vapor pipe, and a canister is provided to detect leakage of fuel vapor based on a change in the pressure of the fuel vapor path.

CITATION LIST

Patent Document

PATENT DOCUMENT 1: Japanese Patent Publication No. H09-105364
PATENT DOCUMENT 2: Japanese Patent Publication No. 2002-317708
PATENT DOCUMENT 3: Japanese Patent Publication No. 2002-4958

SUMMARY OF THE INVENTION

Technical Problem

Incidentally, when an outlet of a fuel filler pipe at the front end thereof is open under the fuel oil surface in a fuel tank, the amount of fuel vapor generated during refueling is smaller than when the outlet is open to an upper space in the fuel tank. Therefore, in order to prevent leakage of fuel vapor during refueling, the outlet of the fuel filler pipe at the front end thereof is preferably positioned at as low a level as possible in the fuel tank.

However, since, in this case, fuel is also in the fuel filler pipe, an air space which does not communicate with the upper space in the fuel tank is formed in an upper portion of the fuel filler pipe, thereby affecting a diagnosis of leakage of fuel vapor performed by the pressure sensor. Specifically, since fuel can freely flow between the fuel tank and the fuel filler pipe, a measurement of the pressure of the fuel vapor path including the fuel tank is affected by the air space in the fuel filler pipe, thereby reducing the accuracy of the diagnosis.

To address this problem, the present invention provides a fuel vapor handling system for an automotive fuel tank, and the system prevents leakage of fuel vapor to the outside during refueling, and can perform a diagnosis of leakage of fuel vapor with good accuracy even when an air space is formed in an upper portion of a fuel filler pipe.

Solution to the Problem

According to the present invention, in order to solve the above problem, an upper space in a fuel tank and an upper space in a fuel filler pipe communicate with each other through an airflow resistance pipe, and during refueling, fuel vapor is prevented from flowing through the airflow resistance pipe into the fuel filler pipe.

Specifically, in the present invention, a fuel vapor handling system for an automotive fuel tank includes: a fuel tank configured to store fuel; a fuel filler pipe configured to supply fuel to the fuel tank; a canister which is configured to absorb fuel vapor, and from which the absorbed fuel vapor can be desorbed; a fuel vapor pipe through which fuel vapor is guided from the fuel tank to the canister during refueling; a purge pipe through which the fuel vapor absorbed by the canister is released to an intake system of an engine; an open-to-air pipe through which the canister is open to air; and a pressure sensor configured to detect an internal pressure of a fuel vapor path including the fuel tank, the fuel vapor pipe, and the canister, and perform a diagnosis of leakage of fuel vapor. The system includes an airflow resistance pipe through which an upper space in the fuel tank (a space above the fuel oil surface) and an upper space in the fuel filler pipe (a space above the fuel oil surface) communicate with each other, and an airflow resistance of the airflow resistance pipe is adjusted to restrict flow of fuel vapor from the fuel tank through the airflow resistance pipe into the fuel filler pipe during refueling.

Therefore, fuel vapor generated in the fuel tank during refueling flows into the fuel vapor pipe, and is absorbed by the canister. Specifically, fuel vapor is prevented from being released through the airflow resistance pipe toward the upper space in the fuel filler pipe, thereby advantageously preventing leakage of fuel vapor to the outside. In a diagnosis of leakage of fuel vapor from the fuel vapor path, a change in the pressure of the fuel vapor path is detected by the pressure sensor, and the fuel vapor path and the upper space in the fuel filler pipe have substantially the same pressure, because the upper space in the fuel tank and the upper space in the fuel filler pipe communicate with each other through the airflow resistance pipe. Thus, even when an air space is formed in the fuel filler pipe, the air space is prevented from affecting a value detected by the pressure sensor, thereby preventing a reduction in the accuracy of the diagnosis of leakage of fuel vapor.

In order to adjust the airflow resistance of the airflow resistance pipe, the airflow resistance pipe may include an orifice configured to restrict flow of fuel vapor from the fuel tank into the upper space in the fuel filler pipe during the refueling.

Advantages of the Invention

According to the present invention, a fuel vapor handling system for an automotive fuel tank is configured such that during refueling, fuel vapor is guided from the fuel tank to the canister, absorbed by the canister, and released from the canister to the intake system of the engine, and a diagnosis of leakage of fuel vapor is performed by detecting a change in the internal pressure of the fuel vapor path including the fuel tank, the fuel vapor pipe, and the canister using the pressure sensor, and in the system, the upper space in the fuel tank and the upper space in the fuel filler pipe communicate with each other through the airflow resistance pipe, and the airflow resistance of the airflow resistance pipe is adjusted to restrict flow of fuel vapor from the fuel tank through the airflow resistance pipe into the fuel filler pipe during refueling. Therefore, fuel vapor is advantageously prevented from leaking to the outside, and a diagnosis of leakage of fuel vapor is advantageously performed with good accuracy. The reason why this diagnosis is advantageously performed is that the level of the fuel oil surface in the fuel tank is higher than that of the outlet of the fuel filler pipe at the front end thereof, and thus, even when an air space is formed in an upper portion of the fuel filler pipe, the air space is prevented from affecting a value detected by the pressure sensor.

BRIEF DESCRIPTION OF THE DRAWING

FIG. 1 is a block diagram of a fuel vapor handling system for an automotive fuel tank according to the present invention.

DESCRIPTION OF EMBODIMENT

An embodiment for carrying out the present invention will be described hereinafter with reference to the drawing. The following embodiment is merely a preferred example in nature, and is not intended to limit the scope, applications, and use of the invention.

In FIG. 1, the reference character 1 denotes an airtight fuel tank configured to store fuel for an automobile, the reference character 2 denotes a fuel filler pipe configured to supply fuel to the fuel tank 1, and the reference character 3 denotes a canister containing activated carbon which absorbs fuel vapor and from which the absorbed fuel vapor can be desorbed. The fuel tank 1 and the canister 3 are coupled together through a fuel vapor pipe 4 through which fuel vapor in the fuel tank 1 is guided to the canister 3. A purge pipe 5 through which fuel vapor absorbed by the canister 3 is released to an intake system of an engine, and an open-to-air pipe 6 through which the canister 3 is open to the air are connected to the canister 3.

A float valve 7 configured to close with detection of a full tank condition during refueling, and configured to close in the event of automobile rollover and address the rollover is disposed in an upper portion of the fuel tank 1, and one end of the fuel vapor pipe 4 communicates with the fuel tank 1 through the float valve 7. The fuel vapor pipe 4 includes a pressure sensor 8 for a diagnosis of leakage of fuel vapor. The open-to-air pipe 6 includes a dust filter 9 for removing atmospheric dust introduced into the canister 3, and a valve 11 for blocking the open-to-air pipe 6 when leakage of fuel vapor has been detected.

An upper space in the fuel tank 1 and an upper space in the fuel filler pipe 2 are connected together through an airflow resistance pipe 12. The airflow resistance pipe 12 has a portion corresponding to a stainless pipe 12a, and a portion corresponding to a rubber pipe 12b, and the portion corresponding to the rubber pipe 12b includes an orifice 13 for restricting the flow of fuel vapor from the fuel tank 1 to the fuel filler pipe 2 during refueling. The inside diameter (path diameter) of the stainless pipe 12a of the airflow resistance pipe 12 is approximately 6-7 mm, and the orifice 13 reduces the path diameter to 20-40% of the path diameter of the portion corresponding to the stainless pipe 12a.

The reference character 14 denotes a cap for the fuel filler pipe 2, the reference character 15 denotes fuel in the fuel tank 1, the reference character 16 denotes an upper space in the fuel tank 1, and the reference character 17 denotes an upper space in the fuel filler pipe 2 (an air space above the fuel oil surface). A fuel supply system for supplying fuel from the fuel tank 1 to a fuel injection valve of an engine is not shown in FIG. 1.

In a fuel vapor handling system for the automotive fuel tank, when the fuel tank is refueled after removal of the cap 14 and insertion of a fuel filler gun (not shown) into the fuel filler pipe 2, the pressure of the upper space 16 in the fuel tank 1 increases. In this case, the valve 11 of the open-to-air pipe 6 is open, and fuel vapor in the upper space 16 is guided through the fuel vapor pipe 4 to the canister 3, and is absorbed by the canister 3.

When the pressure of the upper space 16 in the fuel tank 1 sharply increases as in this refueling, fuel vapor flows to a path extending through the fuel vapor pipe 4 to the canister 3 and having low airflow resistance, and the flow of fuel vapor to the airflow resistance pipe 12 having high airflow resistance is substantially blocked by the orifice 13. This prevents fuel vapor from leaking into the air. The flow of fuel vapor to the canister 3 reduces an increase in the pressure of the upper space 16, thereby achieving smooth refueling. Also except during refueling, with an increase in the pressure of the upper space 16 in the fuel tank 1, fuel vapor is guided from the upper space 16 to the canister 3, and is absorbed by the canister 3.

When the fuel vapor absorbed by the canister 3 is purged, the intake air pressure of the engine is introduced into the purge pipe 5 with the valve 11 open. This allows fuel vapor to be desorbed from the canister 3, and the desorbed fuel vapor and air introduced through the open-to-air pipe 6 into the canister 3 are released through the purge pipe 5 to the intake system of the engine.

Next, a diagnosis of leakage of fuel vapor will be described. When the intake air pressure of the engine is utilized, the intake air pressure is introduced through the purge pipe 5 into a fuel vapor path including the upper space 16 in the fuel tank 1, the canister 3, and the fuel vapor pipe 4 with the valve 11 of the open-to-air pipe 6 closed. Then, a change in the pressure of the fuel vapor path after the introduction of the intake air pressure is detected by the pressure sensor 8, and a diagnosis of the presence or absence of leakage of fuel vapor (whether or not the fuel vapor path has been, e.g., perforated) is performed based on the change in pressure. A change in the pressure of the fuel vapor path after shutdown of the engine is detected by the pressure sensor 8, and alternatively, when a pressure pump is further provided, and a predetermined pressure is applied to the fuel vapor path with the valve 11 closed, a change in the pressure of the fuel vapor path is detected by the pressure sensor 8, thereby performing a diagnosis of the presence or absence of leakage of fuel vapor.

In the above diagnosis of leakage of the fuel vapor, a change in the pressure of the fuel vapor path is detected by the pressure sensor 8 as described above, and the fuel vapor path and the upper space 17 in the fuel filler pipe 2 have substantially the same pressure, because the upper space 16 in the fuel tank 1 an the upper space 17 in the fuel filler pipe 2 communicate with each other through the airflow resistance pipe 12. Thus, even when an air space is formed in the fuel filler pipe 2, the air space is prevented from affecting a value detected by the pressure sensor 8, thereby preventing a reduction in the accuracy of the diagnosis of leakage of fuel vapor.

The fuel tank 1 may include the pressure sensor 8.

The outlet of the fuel filler pipe 2 at the front end thereof may be positioned below the lowest fuel oil surface defined in the fuel tank 1. The "lowest fuel oil surface" is the fuel oil surface serving as a threshold value for recommending refueling because of a small amount of fuel left, and the fuel oil surface under normal conditions is positioned above the lowest fuel oil surface.

DESCRIPTION OF REFERENCE CHARACTERS

1 Fuel Tank
2 Fuel Filler Pipe
3 Canister
4 Fuel Vapor Pipe
5 Purge Pipe
6 Open-To-Air Pipe
8 Pressure Sensor
12 Airflow Resistance Pipe
13 Orifice
16 Upper Space in Fuel Tank
17 Upper Space in Fuel Filler Pipe

The invention claimed is:

1. A fuel vapor handling system for an automotive fuel tank, the system comprising:
   a fuel tank configured to store fuel;
   a fuel filler pipe configured to supply fuel to the fuel tank;
   a canister which is configured to absorb fuel vapor, and from which the absorbed fuel vapor can be desorbed;
   a fuel vapor pipe through which fuel vapor is guided from the fuel tank to the canister during refueling;
   a purge pipe through which the fuel vapor absorbed by the canister is released to an intake system of an engine;
   an open-to-air pipe through which the canister is open to air; and
   a pressure sensor configured to detect a change in an internal pressure of a fuel vapor path including the fuel tank, the fuel vapor pipe, and the canister, and perform a diagnosis of leakage of fuel vapor, wherein:
   an outlet of the fuel filler pipe at a front end of the fuel filler pipe is positioned below a lowest fuel oil surface defined in the fuel tank,
   the system includes an airflow resistance pipe through which an upper space in the fuel tank and an upper space in the fuel filler pipe communicate with each other such that a pressure of the fuel vapor path is equal to a pressure of the upper space in the fuel filler pipe to perform the diagnosis of leakage of fuel vapor, and
   an airflow resistance of the airflow resistance pipe is adjusted to restrict flow of fuel vapor from the fuel tank through the airflow resistance pipe into the fuel filler pipe during refueling.

2. The system of claim 1, wherein
the airflow resistance pipe includes an orifice configured to restrict flow of fuel vapor from the fuel tank into the fuel filler pipe during the refueling.

* * * * *